United States Patent

Koizumi et al.

[11] Patent Number: 5,128,574
[45] Date of Patent: Jul. 7, 1992

[54] BRUSHLESS MOTOR

[75] Inventors: Shigeki Koizumi; Hiroshi Oka, both of Saitama, Japan

[73] Assignee: Canon Kabushiki Kaisha, Tokyo, Japan

[21] Appl. No.: 505,223

[22] Filed: Apr. 5, 1990

[30] Foreign Application Priority Data

| Apr. 11, 1989 | [JP] | Japan | 1-089667 |
| May 16, 1989 | [JP] | Japan | 1-122667 |
| May 31, 1989 | [JP] | Japan | 1-137691 |

[51] Int. Cl.⁵ .................................... H02K 7/08
[52] U.S. Cl. ........................ 310/90; 310/89; 310/157; 369/271; 384/563
[58] Field of Search ............ 310/67 R, 156, 90, 91, 310/44, 157, 89; 369/271; 384/517, 518, 563

[56] References Cited

U.S. PATENT DOCUMENTS

| 2,577,035 | 12/1951 | Reid | 369/271 |
| 3,255,512 | 6/1966 | Lochner | 310/44 |
| 3,726,576 | 4/1973 | Barnbrook | 384/563 |
| 3,786,289 | 1/1974 | Backlawski | 310/90 |
| 4,033,644 | 7/1977 | Rennerkens | 384/563 |
| 4,499,514 | 2/1985 | Yamamija | 369/271 |
| 4,658,312 | 4/1987 | Elasser | 310/156 |
| 4,814,652 | 3/1989 | Wright | 310/67 R |
| 4,866,324 | 9/1989 | Yuzawa | 310/44 |
| 4,867,581 | 9/1989 | Schmidt | 310/67 R |
| 4,900,961 | 2/1990 | Kudo | 310/90 |

FOREIGN PATENT DOCUMENTS

| 0049414 | 5/1981 | Japan | 384/517 |
| 0196320 | 11/1983 | Japan | 384/517 |
| 0169116 | 7/1989 | Japan | 384/517 |

Primary Examiner—R. Skudy
Attorney, Agent, or Firm—Fitzpatrick, Cella, Harper & Scinto

[57] ABSTRACT

A brushless motor whose stator keeps hold of coils and is made of either magnetic-power-blended resin by molding techniques, or magnetic powder by sintering techniques.

5 Claims, 10 Drawing Sheets

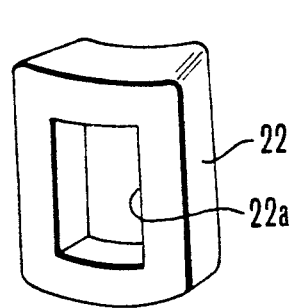
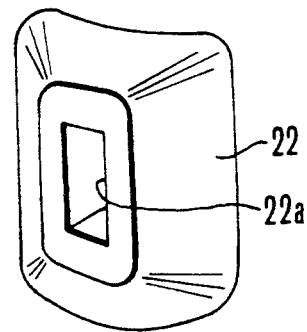
FIG.7    FIG.8
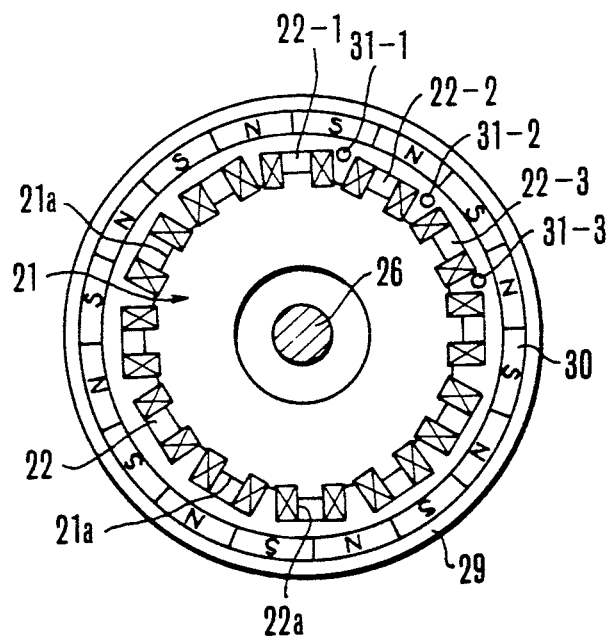
FIG.9 ized part of the stator, while still permitting

BRUSHLESS MOTOR

BACKGROUND OF THE INVENTION

1. Field of the Invention

This invention relates to brushless motors of the coreless type.

2. Description of the Related Art

Brushless motors, consist of the plane-opposed type and the circumference-opposed type. In the plane-opposed type, a coreless form having air-core coils is used. In the circumference-opposed type, the salient-pole-equipped core motors are primarily used.

The motor of the plane-opposed type, however, has the disadvantage that the motor is becomes large. Also, the attempt to reduce the motor diameter by increasing the strength of the magnet leads to an increased loss because the force of magnetic attraction becomes large.

Meanwhile, in the salient pole form of the circumference-opposed type motor, as the strength of the magnet increases, the cogging torque gets larger. Also, the decrease of the motor diameter makes it impossible to assure creation of an space adequate for coils to occupy.

Again, in the coreless form of the circumference-opposed type motor, there are drawbacks; for example, to maintain a hold of the coils is difficult, and, if the motor diameter is small, the use of flat air-core coils, because it causes the gap to become larger, lowers the magnetic efficiency.

FIG. 1 and FIG. 2 are schematic sectional views of conventional motors. These motors have a feature suited to be used as the optical spindle motor.

In FIG. 1, a motor housing 1 has its inner diameter portion hold two bearings 5A and 5B in a spaced relation from each other by a predetermined distance. These bearings 5A and 5B form a shaft receptor portion, of which the central hole rotatably contains a shaft 2.

The shaft 2 is for centering an optical medium or like record bearing body (not shown), on which a turntable 3 for carrying the optical medium to rotate is fixedly fitted at its upper portion.

A bush 7 is fitted on the lower portion of the shaft 2 in an adjusted position and then fixedly secured to the shaft 2 by adhesive agent or the like.

By this fixture of the bush 7, a state that an inward impelling pressure (pre-load) acts on the two bearings 5A and 5B in between the turntable 3 and the bush 7, is maintained.

Under the condition that such a pre-load functions, the inner or outer races and bearing balls of the bearings 5A and 5B are biased to one direction. Therefore, the shaft receptor portion can be constructed without looseness.

The above-described way of sealing the pre-load in the bearings 5A and 5B by regulating the positions of the bearings 5A and 5B is, in general sense, called the "constant-position pre-load".

A rotor 8 is fixedly mounted on the aforesaid bush 7 by screw fasteners 10, and fixedly carries magnets 9 on the inner surface thereof.

On the lower end of the aforesaid motor housing 1, a PCB (printed circuit board) 12 for coil arrangement on which coils 11 are fixedly mounted and a stator yoke 13 constituting a magnetic circuit together with that PCB 12 adhered thereto are fixedly mounted by screw fasteners 14.

The coils 11 and the magnets 9 are arranged in plane-opposed relation.

When the coils 11 are supplied with current, an electromagnetic action takes place as is known in the art, so that the magnets 9 receive a rotative force. This force is transmitted to the rotor 8, the bush 7, the shaft 2 and the turntable 8 successively to drive the record bearing body (not shown) such as the optical medium.

In another conventional example of the bearing mechanism shown in FIG. 2, a pre-load spring 15 is used as arranged between one of the bearings 5B and the shoulder of a projected step portion 1b.

A collar 16 is positioned between the inner races of the bearings 5A and 5B.

Then, the bush 7 is fitted on the shaft 2 and fixedly secured thereto by adhesive agent or the like in the condition that the bearings 5A, the collar 16 and the bearing 5B abut against the turntable 3. With this, the outer race of the bearing 5B is pressed by the action of the aforesaid pre-load spring 15. Thus, removal of the looseness of the bearings 5A and 5B can be attained.

The structure of the shaft bearing mechanism of FIG. 2 is different from that of FIG. 1 in the above-described manner. The other parts have the same structure. So, the corresponding parts are denoted by the same reference numerals and their detailed explanation is omitted here.

This second example of the conventional mechanism of bearing the shaft is to use the pre-load spring 15 for removing the looseness of the bearings 5A and 5B. Such a method is called the "constant-pressure pre-load".

But, the constant-position pre-load type of shaft bearing mechanism has a tendency that if, as the motor housing thermally expands, or the bearings 5A and 5B are worn out, the pre-load is lost, looseness is apt to occur.

In more detail, as is seen from the graph of FIG. 3A the thrust displacement $\delta$ for the thrust load P of the bearing amounts to only a few microns. As the thermal expansion or abrasion increases, therefore, the amount of pre-load rapidly decreases. Hence, the mechanism of FIG. 1 has a property of allowing the looseness to take place.

For the constant-pressure type shaft bearing mechanism of FIG. 2, on the other hand, because the assembly of the outer race of the bearing 5B and the motor housing 1 is free fitting, a position error of the bearing 5B is liable to occur.

From this reason, it was sometimes practiced in the high-precision motor to fixedly secure the bearing 5B to the motor housing 1. In this case, similar to the constant-position pre-load type of FIG. 1, a decrease in the pre-load is apt to occur.

Another problem with the structure of FIG. 2 is that when the aforesaid fixedly securing means is not in use, the shaft bearing portion has its rigidity lowered.

SUMMARY OF THE INVENTION

With the above-described technical problems of the prior art in mind, the present invention has been made and proposes a motor which employs a strong magnet to reduce the motor diameter and enables a large space for the coils, while still permitting holding of the coils to be maintained easily.

Further, in application to the motor of such a structure that the stator members are made of magnetic-particle-blended resin material and formed in a hollow cylindrical shape, and rotor yokes and magnet pieces are arranged adjacent the outer periphery of the stator and mounted on a rotatable shaft, the present invention proposes a structure that hold of the aforesaid stator is stably kept on a base member.

Further, the present invention proposes a motor suited to the information read-out apparatus of the type in which a disk having information recorded thereon such as optical disk an opto-magnetic disk, or a magnetic disk is rotated by the motor when the information recorded on the disk is read out by a reading means.

Also, the present invention has an object to provide a mechanism for bearing the shaft of the motor, which, though being of simple structure, can prevent the pre-load from being eliminated, and, even when subjected to thrust load, does not change its position in the direction of height.

Further, in application to the shaft bearing mechanism of the constant-position pre-load type motor in which a shaft is assembled in such a way that it is inserted through two bearings arranged in concentrically spaced relation by a predetermined distance and then seated with the outside end faces of the aforesaid two bearings regulated in position, the present invention achieves the above-described object by employing an assembling structure that a plate spring of bent shape is first fitted on the shaft, and a thrust pressure is applied to the plate spring until it becomes like a plain washer, thus being hardly moved even by the thrust load.

These and other objects and features of the invention will be apparent from the following detailed description of embodiments thereof and the accompanying drawings.

BRIEF DESCRIPTION OF THE DRAWINGS

FIG. 4 through FIG. 10 show a first embodiment of the invention.

FIG. 4 is a longitudinal section view of the brushless motor.

FIG. 5 is a cross-sectional view taken along a line II—II of FIG. 4.

FIG. 6 is a schematic perspective view of the stator and the drive coils of FIG. 4.

FIG. 7 and FIG. 8 are schematic perspective views of examples of the shape of the drive coil usable in the invention.

FIG. 9 is a cross-sectional view of another example of the brushless motor of the invention.

FIG. 10 is a schematic longitudinal section view of the stator of still another example of the brushless motor of the invention.

FIG. 11 is a schematic longitudinal section view illustrating the shaft bearing structure of the motor according to the second embodiment of the invention.

FIG. 12 is a top view of the motor of FIG. 11.

FIG. 13 is a perspective view of the plate spring for pre-load in FIG. 11.

FIG. 14 is a sectional view of the plate spring of FIG. 13 before it is assembled.

FIG. 15 is a sectional view of the plate spring of FIG. 13 after it is assembled.

FIG. 16 is a perspective view of another example of variation of the plate spring for pre-load.

FIG. 17 is a top view of the spring of FIG. 16.

FIG. 18 is a sectional view of the spring of FIG. 16.

FIG. 19 is a graph illustrating the relation between the spring load and the amount of contraction of the plate spring of FIG. 16.

DETAILED DESCRIPTION OF THE PREFERRED EMBODIMENTS

Figure 4:
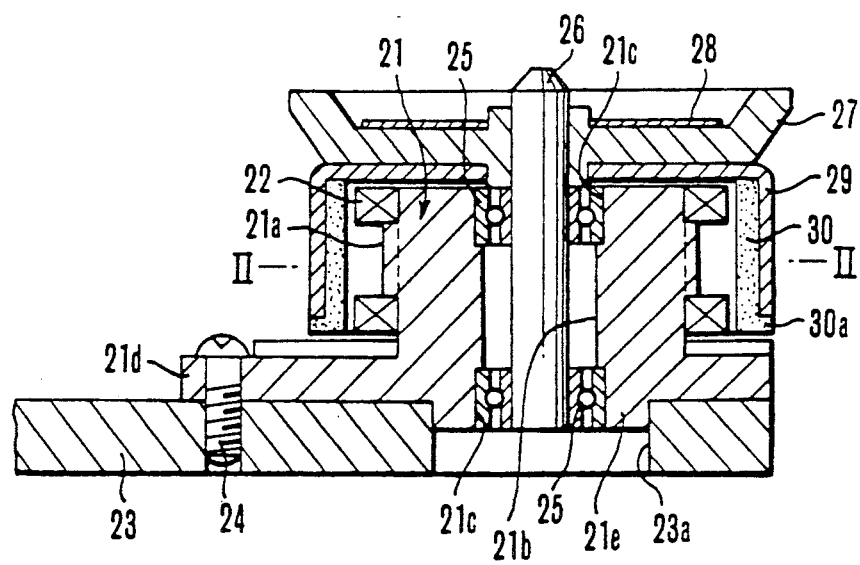
Figure 5:
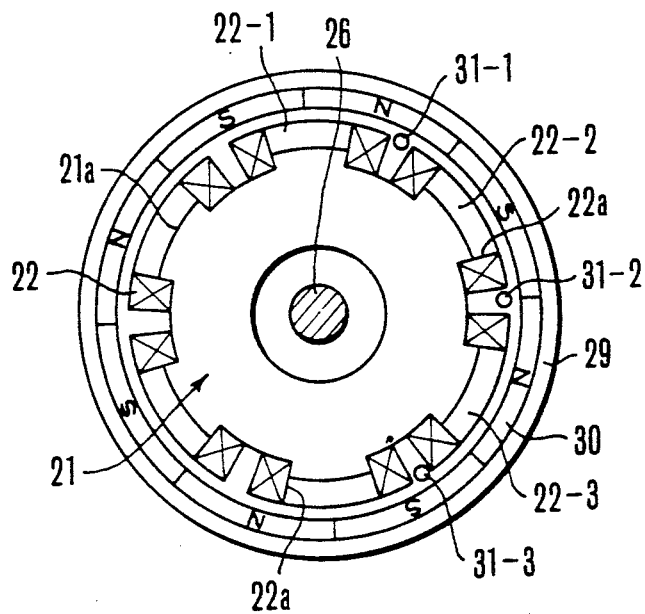
Figure 6:
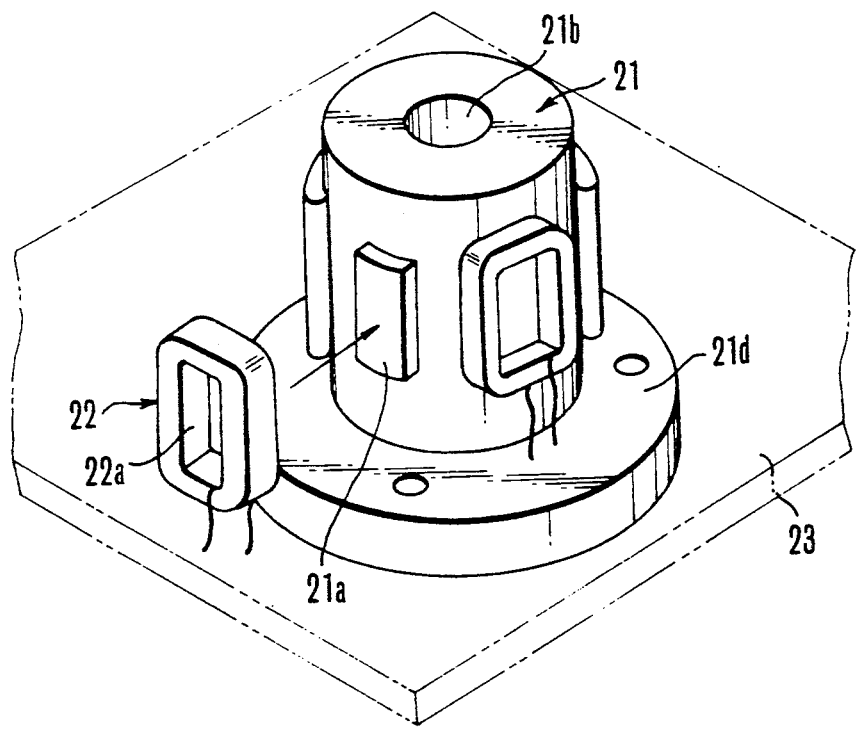

FIG. 4 is a longitudinal section view of a first embodiment of a brushless motor according to the invention. FIG. 5 is a cross-sectional view taking along a line II—II of FIG. 4. FIG. 6 is a perspective view of the stator and coils constituting a stationary part of the motor of FIG. 4.

In FIG. 4 through FIG. 6, a stator 21 is made of resin containing iron particles or like magnetic particles by molding techniques, or magnetic powder by sintering and constitutes the stator of the stationary part. On the peripheral surface of the stator 21, guide portions 21a of convex form are positioned with a predetermined pitch in the circumferential direction.

These guide portions 21a are for keeping hold of air-core coils 22 in predetermined positions by fitting in the central openings 22a of the air-core coils 22.

FIG. 7 and FIG. 8 are perspective views illustrating examples of the construction of the aforesaid drive coil 22. FIG. 7 shows a case of the rectangular cross section where each layer has the same number of turns. FIG. 8 shows another case of pyramid form where the number of turns is smaller toward the upper layer.

In the coil of the rectangular cross section of FIG. 7, there are advantages that the gap for the rotor can be made uniform, and the number of turns can be taken to be large. But, after a wire has been turned, the coil must be pressed to a round shape. Hence, there is a the disadvantage of on the increased cost.

Meanwhile, in the case of the pyramid form of FIG. 8, though the gap for the rotor can be made uniform and a large number of turns can be taken, a special tool is necessary to use in forming the coil and elaborate operations have to be carried out when a wire is turned.

A penetration hole 21b is formed in the central portion of the aforesaid stator 21. In both end portions of the penetration hole 21b, over-bored portions 21c are formed, in which the respective bearings 25, 25 are fitted under pressure.

Again, in the stator 21, an armed portion 21d is formed, extending from the outer peripheral surface to the radial direction. The stator 21 is mounted on a body base 23 by fixing the armed portion 21d to the body base 23 by bolts 24.

Again, in the lower end surface of the stator 1, a projected portion 21e is formed to be fitted in a locating hole 23a of the body base 23 without any gap.

A shaft 26 that is a rotation axis is guided and supported by the central holes of the bearings 25, 25 fixedly fitted in the over-bored portions 21c, 21c of the stator 21.

A rotor yoke 29 of drum form is fixedly mounted on the projected end (upper end) portion of the shaft 26. On its upper side, a turntable 27 on which a body to be driven such as the optical medium is to be loaded is fixedly mounted. Incidentally, an attraction magnet 28 for keeping hold of the body to be driven is fixedly mounted on the upper surface (support surface) of the turntable 27.

A drive magnet 30 is fixedly mounted on the inner peripheral surface of the drum-shaped rotor yoke 29 in opposed relation to the outer peripheral surface of each of the air-core coils 22 by a predetermined gap.

The magnet 30, as shown in FIG. 5, has a large number of elements magnetized to N and S poles alternately in the circumferential direction.

Thus, when current is supplied to the aforesaid air-core coils (drive coils) 22, a torque is generated by the electromagnetic force acting on between the magnet 30 and the coils 22.

Incidentally, on the lower side of the drive magnet 30, an armed portion 30a for generating an FG output is formed in a letter "L" shape.

In FIG. 5, the drive coils 22-1, 22-1, 22-2, 22-2, 22-3, 22-3 constitute a 3-phase coil.

Hall elements 31-1, 31-2 and 31-3 for detecting the phase changeover position are arranged between adjacent two of the drive coils 22-1, 22-2, 22-3 of the respective phases, thus constituting a 3-phase brushless motor.

The aforesaid drive coils 22 each are formed to a circumferentially curved shape so as to become an almost concentric shape in order to make uniform the gap for the rotating drive magnet 30.

According to the above-described embodiment, the stator 21 of housing shape is formed by molding out of magnetic-particle-blended resin or by sintering magnetic powder, and a plurality of coreless type drive coils 22, which are to be circumferentially arranged, are mounted by utilizing the guide portions 21a of convex shape (FIG. 6) or concave shape (not shown) formed in unison in the peripheral surface of the stator 21. Hence, a circumference-opposed type brushless motor which enables the strength of the magnet to be increased without having to increase the cogging torque and a space for the coils to be sufficiently secured without increasing the motor diameter Further, since the bearing holding portions 21c are formed in unison in the inner diameter portion of the housing-shaped stator 21, a brushless motor which enables a reduction in the number of parts and a lowering of the cost to be achieved is obtained.

FIG. 9 in cross-sectional view shows another example of the brushless motor according to the invention.

In this example, the drive coils of the 3-phase brushless motor are 12 in number as mounted in the circumferential direction, and the drive magnet 30 on its outside is magnetized to 16 poles in the circumferential direction.

By such an increase in the number of coils 22, the width of each coil 22 becomes smaller. Without the necessity of forming each coil 22 to the curved shape as has been mentioned before, therefore, the gap for the magnet 30 can be made almost uniform.

Though the example of FIG. 9 is different in the above-described point from the example of FIG. 4 and FIG. 5, the other parts have substantially the same structure. Therefore, the corresponding parts are denoted by the same reference numerals and their detailed explanation is omitted.

Even by this example, equivalent results to those described above can be attained.

Figure 10:
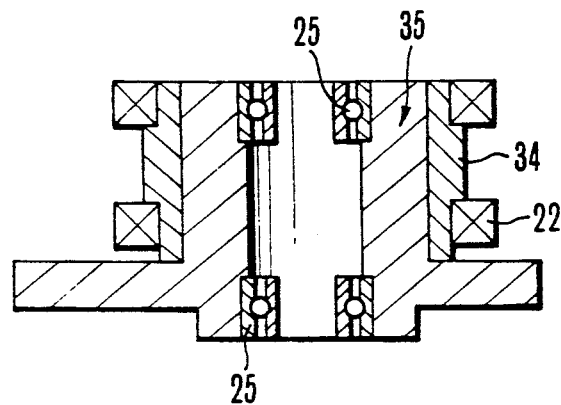

FIG. 10 in longitudinal section view shows still another example of the brushless motor of the invention.

In this example, a portion of the motor which constitutes the housing 21 is divided into a stator 34 and a bearing boss 35, and both are made of different parts from each other.

In this case, the aforesaid stator 34 may be made of similar material to that of the before-described housing 21, or a mold of resin containing iron ingredients or like magnetic powder, and the aforesaid bearing boss 35 may be made of non-magnetic material such as resin and aluminum.

Though the example of FIG. 10 is different in the above-described points from the example of FIG. 4 and FIG. 5, the other parts have substantially the same structure. So, the corresponding parts are denoted by the same reference numerals and their detailed explanation is omitted.

Even by this example, the same results as those of each of the above-described examples can be attained. That is, since the stator of the housing shape is formed by molding out of a magnetic-particle-blended resin or by sintering iron powder, and the plurality of coreless type drive coils 22 which are to be arranged in the circumferential direction are mounted by utilizing the guide portions 21a of convex shape or concave shape formed in unison in the peripheral surface of the stator 21, the magnet can be made stronger without increasing the cogging torque, and the space for the coils can sufficiently be secured without increasing the motor diameter, and further the drive coils can be easily and accurately positioned, when the circumference-opposed type brushless motor is obtained.

Further, since the bearing holding portions 21c are formed in unison in the inner diameter portion of the stator 21 of the housing shape, a reduction of the number of parts and a lowering of the cost can be achieved when the brushless motor is obtained.

By these advantages, it has been made possible to further advance the minimization of the size and the improvement of efficiency of the compact brushless motor of the circumference-opposed type.

As is apparent from the foregoing, according to the present embodiment of the brushless motor, since it has a feature that the stator holding the coils is formed by molding out of a magnetic-ingredient-blended resin or by sintering magnetic powder, it is in the circumference-opposed type of brushless motor that a strong magnet is used and a sufficiently large space for the coils can be secured, while still permitting a simplification of the structure of construction and a lowering of the cost to be achieved, when the brushless motor is obtained.

In the above-described embodiment, if another feature that the stator is provided with the guide portions of convex shape or concave shape for locating the aforesaid coils and the air-core coils are mounted on these guide portions, or another feature that the stator also serves as the member for holding the bearings, is employed, the degree of the above-described advantages can be more enhanced.

Next, a second embodiment is described by reference to FIG. 11 through FIG. 19.

Figure 11:
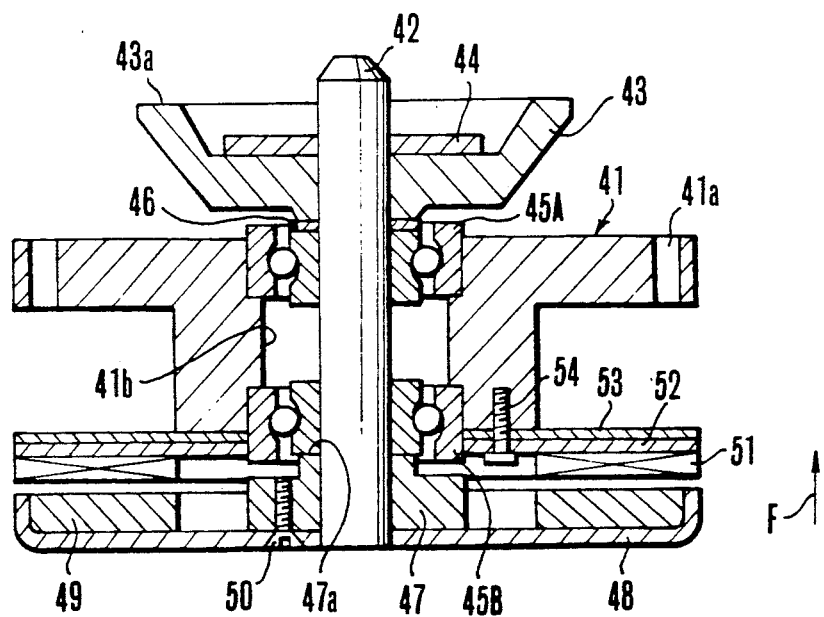
FIG. 11 through FIG. 19 show another embodiment of the invention.
Figure 12:
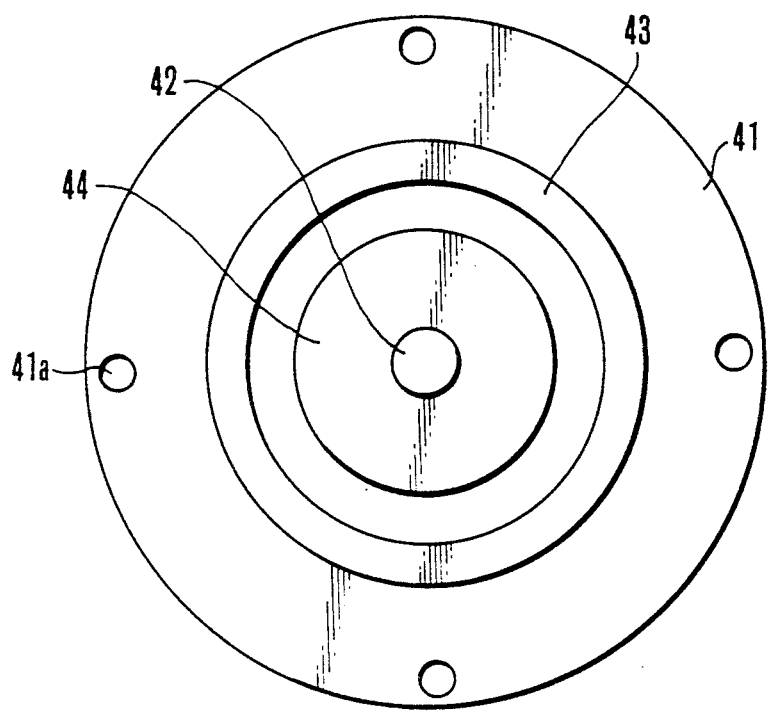

FIG. 11 is a longitudinal section view of a motor having a shaft bearing mechanism according to the second embodiment of the invention, and FIG. 12 is a top view of the motor of FIG. 11.

The present embodiment is exemplified as applied to the optical spindle motor.

In FIG. 11, a motor housing 41 keeps hold of two bearings 45A and 45B in concentrically spaced relation by a predetermined distance in the inner diameter thereof, thus forming a bearing portion for supporting a shaft 42.

The aforesaid shaft 42 functions to do centering of the optical medium (not shown). So, its projected portion fixedly carries a turntable 43 for holding the optical medium to rotate.

An attraction magnet 44 is fixedly mounted on the turntable 43. When the optical medium is loaded, the attraction magnet 44 magnetically attracts a magnet sensitive plate of the photo medium and presses it on the projected portion 43a of the turntable 43, so that the rotating drive power is transmitted to the optical medium.

Figure 13:
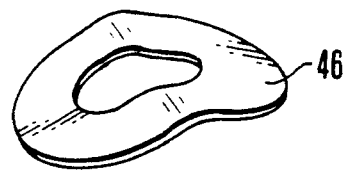

A pre-load spring 46 is sandwiched between the inner lace of the bearing 45A and the turntable 43 and is formed by a plate spring of bent shape as shown in FIG. 13.

A bush 47 is freely fitted on the shaft 42 (to fill the gap). By incorporating this bush 47, a pre-load or pressure applied to each of the bearings 45A and 45B in cooperation with the turntable 43. After that, the bush 47 is fixedly secured to the shaft 42.

Figure 14:
Figure 15:

FIG. 14 shows the sectional shape which the aforesaid pre-load spring 46 has before it is incorporated, and FIG. 15 shows the sectional shape of the aforesaid pre-load spring 46 when incorporated in a collapsed state to a plain flat washer. A rotor 48 has a magnet 49 fixedly mounted in the inside thereof.

The rotor 48 equipped with the magnet 49 is fixedly secured to the aforesaid bush 47 by screw fasteners 50.

Reference numerals 51, 52 and 53 denote respectively coils, a PCB (printed circuit board) for coil wiring, and a stator yoke constituting a magnetic circuit.

The aforesaid coils 51 are fixedly mounted to the PCB 52 for coil wiring. The PCB 52 for coil wiring and the aforesaid stator yoke 53 are fixedly secured to the end face of the motor housing 41 by screw fasteners 54.

Thus, the rotor (48) and the stator (51, 52, 53) are arranged in a plane-opposed relation when the motor is constructed.

Incidentally, a hole 41a for use in fixedly securing the motor is formed in the motor housing 41.

Also, reference numeral 41b denotes a convex stepped portion for locating and fixing the outer races of the aforesaid bearings 45A and 45B in and to the motor housing 41.

Figure 16:
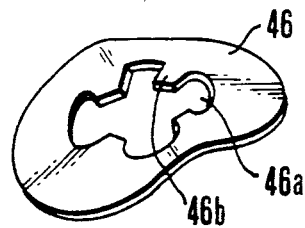
Figure 17:
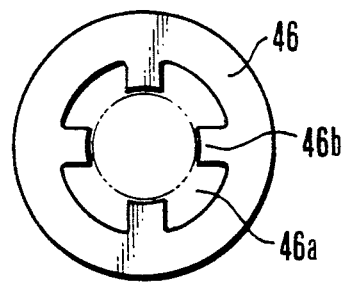
Figure 18:

FIG. 16 is a perspective view illustrating another form of the aforesaid pre-load spring 46, FIG. 17 is a top view of the spring of FIG. 16, and FIG. 18 is a sectional view of the spring of FIG. 16.

In FIG. 16 through FIG. 18, the pre-load spring 46 of this case has a structure that a plurality of (four) extensions 46b and escapes 46a therebetween are formed in the inner diameter of the washer of the bent shape.

With the spring 46 of FIG. 13 through FIG. 15 which has no escapes, on the assumption that it is assembled in a deformed state by giving the spring 46 a bent shape so large a pre-load that the degree of curvature changes from, for example, 800 microns before it is assembled to 80 microns, then when it approaches the plain washer by an external force acting on it to change the degree of curvature to 80 microns through zero, the close portion to the inner diameter does not become flat. For this reason, when the external force acts on, it an error in the height arises. This leads to an error of the focus of the optical pickup.

By providing the escapes 46a as shown in FIG. 16 through FIG. 18, the above-described drawback is eliminated, making it possible that even when the external force is given, the flatness of the spring 46 is easily maintained.

According to the above-described embodiment as applied to the bearing structure that the two bearings 45A and 45B are held in concentrically spaced relation by the predetermined distance within the motor housing 41 and the shaft 42 is inserted through the bearings 45A and 45B, it is within the basic framework employing the constant-position pre-load type that a pre-load spring 46 in the form of a plate spring of bent shape is brought into incorporation in the pressed state (so as to become a plain washer) at a position between the turntable 43 and the bearing 45A or the like where the inner race of each of the bearings 45A and 45B can be given a pre-load. Hence, even if an abrasion or a thermal expansion occurs, the junction of the constant-pressure pre-load type can be maintained. Thus, a shaft bearing structure for the motor which enables the spoil of the pre-load to be effectively prevented from occurring, is obtained.

Also, since the aforesaid pre-load spring 46 is incorporated as it is in form of the plain washer, even if, as the optical medium or like record bearing body is loaded, a force of thrust direction acts on the turntable 43, the position in the height direction does not change. It has been found that the high accuracy can be maintained.

Further, as to the rigidity of the shaft bearing portion, it has been found that the same strength as that in the constant-position pre-load type can be secured.

It is to be noted that in FIG. 11, the aforesaid plate spring (pre-load spring) 46 may otherwise be positioned in a space between the bearing 45B and the bush 47 (the position 47a). It has been found that even with such an arrangement, an equivalent result can be attained.

In particular, not in the case of the plane-opposed type as illustrated, but in the case of the motor having a weak attracting force in the direction indicated by arrow F of the rotor 48 as in the circumference-opposed type, it is preferable that the aforesaid plate spring 46 is incorporated into the space between the bearing 45B and the bush 47.

As is apparent from the foregoing explanation, according to the present embodiment, in the shaft bearing structure of the motor of the constant-position pre-load type in which the shaft is put into assembly by being inserted through the two bearings arranged in concentrically spaced relation by the predetermined distance and by regulating the positions of the outer end surfaces of the paired bearings, a feature is employed that the plate spring of curved shape is fitted on the aforesaid shaft and a thrust pressure is applied thereon until it becomes a plain washer, so that the shaft hardly moves even by the thrust load. Thus, the invention is to provide a shaft bearing structure for the motor which enables the spoiling of the pre-load in the thrust direction to be prevented from occurring and, even if a force of the thrust direction acts on, the position in the axial direction is hindered from changing.

Figure 1:
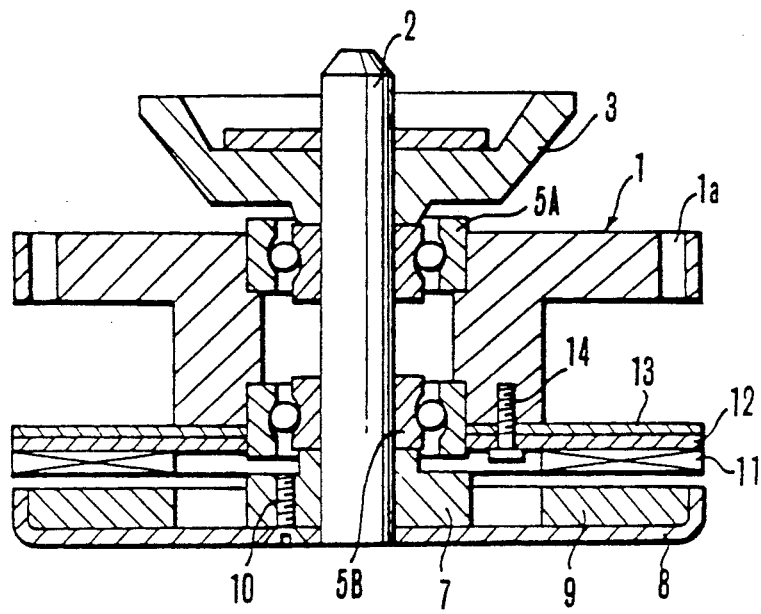
FIG. 1 and FIG. 2 are schematic sectional views of conventional motors.
Figure 2:
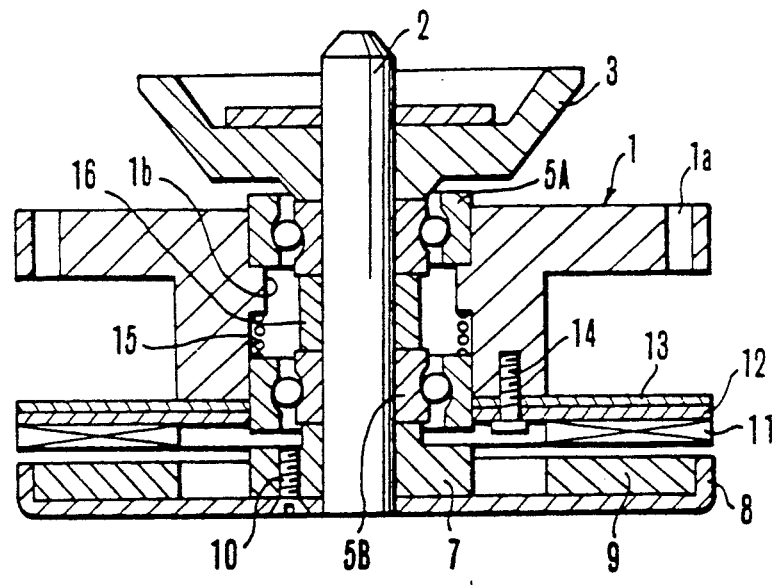

Also, according to the above-described feature, while employing the same structure as that of FIG. 1, the pre-load spring (the plate spring of curved shape) is mounted in between the turntable 43 and the bearing 45A, and the aforesaid pre-load spring, when the pre-load is sealed, is set to become a plain washer. So, when the pre-load is not lost, the shaft bearing structure becomes the constant-position pre-load type. As the pre-load gets away, the plate spring deforms (usually a few microns) to preserve the pre-load.

Figure 19:
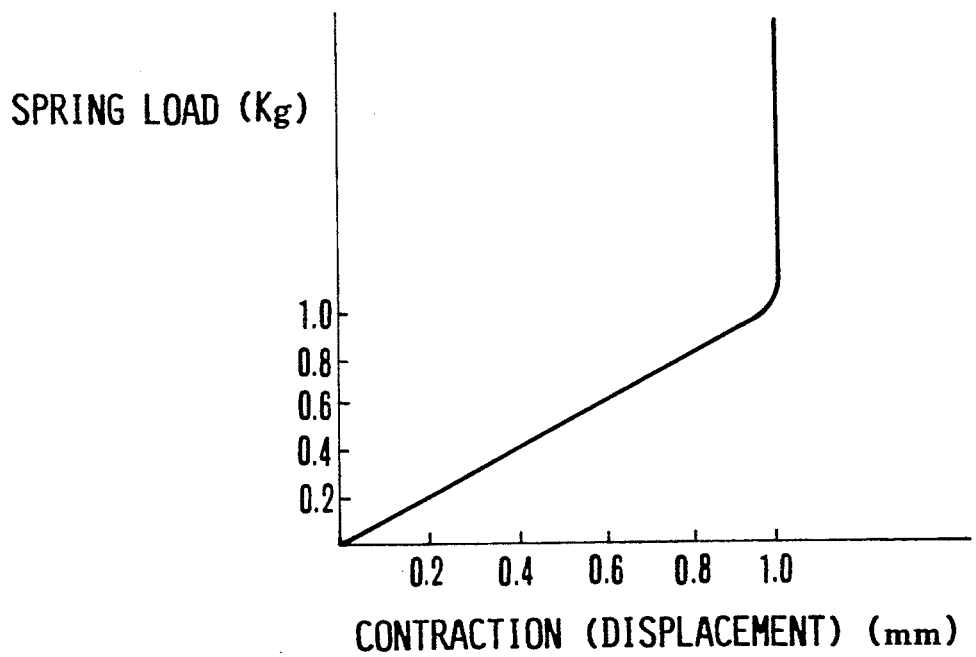

That is, as seen in the graph of FIG. 19, a spring characteristic of almost constant gradient is obtained in a range of contraction (axial displacement) of the plate spring. Hence, the predetermined pre-load can be retained.

Also, since the aforesaid plate spring is made to take the form of the plain washer, the position of the height direction does not change even when a load is put from above the turntable 43.

Further, as to the rigidity, compared with the usual spring pre-load type, it can be kept high.

Figure 20A:
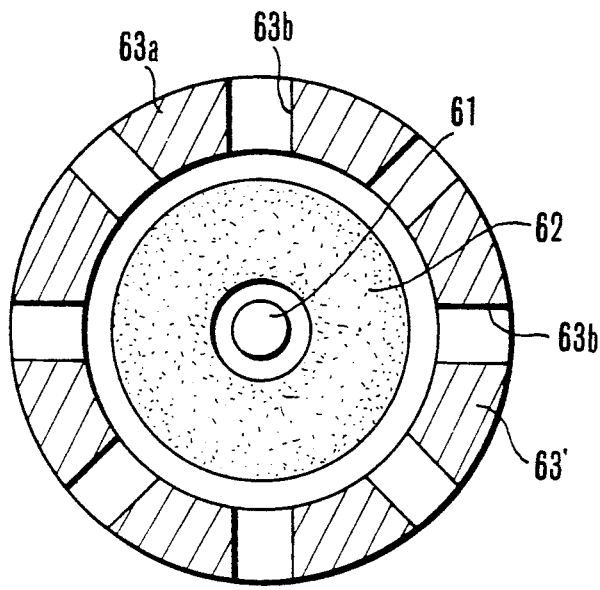
FIG. 20(A) is a top view illustrating the structure of the turntable portion of the disk drive device employing the invention.
Figure 20B:
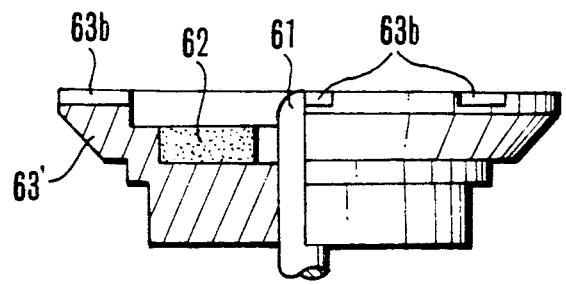
FIG. 20(B) is a partly side elevation, partly sectional view illustrating the structure of the turntable portion of the disk drive device employing the present invention.

FIGS. 20(A) and 20(B) show another embodiment of the invention. This embodiment concerns with an improvement of the turntable 43 shown in the above-described first and second embodiments.

Figure 21A:
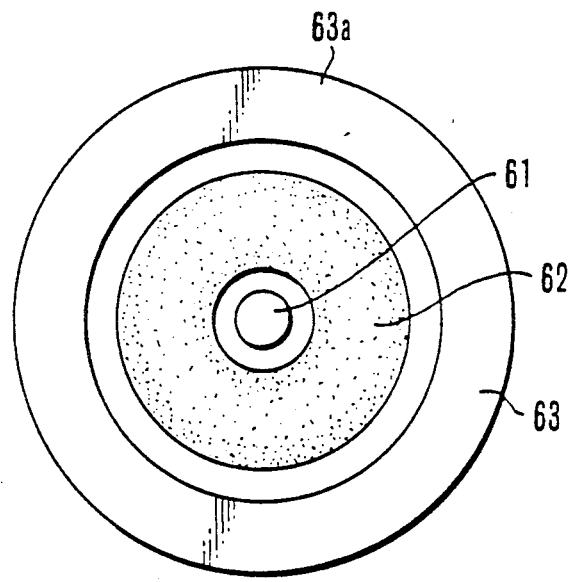
FIG. 21 (A) is a top view illustrating the structure of the turntable portion of the conventional disk drive device.
FIG. 21(B) is a partly side elevation, partly sectional view illustrating the structure of the turntable portion of the conventional disk drive device.
Figure 21B:
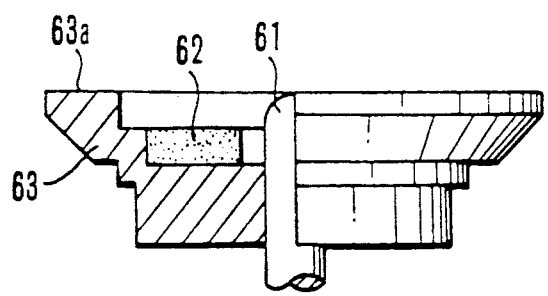

The structure of the turntable portion of the conventional disk drive device, in particular, the optical disk drive device, is shown in FIGS. 21(A) and 21(B).

In FIGS. 21(A) and 21(B), a shaft 61 is connected to the drive shaft of a spindle motor (not shown). A turntable 63 formed to almost dish shape as shown in the left-hand half portion of FIG. 21(B) with its circumferential edge to hold an optical disk (not shown), is connected to the shaft 61. A ring-shaped magnet 62 for attraction of the disk is mounted in a recess of the upper surface of the turntable 63.

As shown in FIGS. 21(A) and 21(B), the disk receiving surface 63a of the turntable 63 of the conventional disk drive device is formed to plane and, when the disk (not shown) is pulled down by the attraction magnet 62, a hub portion at its center intimately contacts with the turntable 63.

However, the above-described conventional structure has some possibility of occurrence of an event that, as chucking is poor due to the dust between the disk and the turntable 63, the normal disk access becomes impossible. This problem is not confined to the optical disk drive device, being common with any other types of drive devices provided the chucking of the disk is effected without using an engagement pin or the like.

To solve the above-described subject, in the present embodiment, the disk drive device of the type in which it is through the drive member having a plane in intimate contact with a disk-shaped recording medium that chucking of the disk-shaped recording medium having a predetermined record-reproduction system is done when it is driven to rotate, has a feature that the disk-shaped recording medium receiving surface of the aforesaid drive member is provided with a plurality of grooves in symmetric positions with respect to the center of rotation of the drive member.

According to the above-described feature, even if the disk-shaped recording medium slips due to foreign substance such as dust between it and the drive member, the foreign substance is kicked into the grooves provided in the disk-shaped recording medium receiving surface of the drive member. Hence, the normal chucking state of the disk-shaped recording medium can immediately be recovered.

In the following, based on FIGS. 20(A) and 20(B), the present embodiment is described in detail.

The structure of the turntable portion of the disk drive device in the present embodiment is shown in FIGS. 20(A) and 20(B). Here the same reference characters have been employed to denote the similar parts to those of the conventional example.

In FIGS. 20(A) and 21(B), what is different from the structure of FIGS. 21(A) and 21(B) is in the structure of a turntable 63'. The other parts have the same structure as in the conventional example.

That is, grooves 63b of relatively wide width and deep depth are formed in the disk receiving surface 63a of the turntable 63'. The grooves 63b are, for example, eight in number in the ring-shaped disk receiving surface 63a in radial form as shown in FIG. 20(A).

It is needless to say that all the grooves 63b must be set in respective symmetric positions with respect to the center of the turntable 63' so that any unbalance of weight does not arise in the turntable 63'.

According to such a structure, in a case where the disk (not shown) has slipped by foreign substance such as dust, the foreign substance between the disk and the turn table 63' is kicked out into the grooves 63b by the slipping of the disk, and finally removed from between the disk receiving surface 63a and the disk. Therefore, the normal disk chucking state is immediately recovered, and the normal disk access becomes possible.

Also, according to the structure of FIGS. 20(A) and 20(B), the use of the grooves 63b leads to an increase in the abutting force per unit contact area of the disk receiving surface 63a of the turntable 63'. Therefore, a more reliable disk chucking becomes possible.

The grooves 63b can be easily made by grinding the turntable 63' of metal or plastic, or by molding of the turntable 63'.

Though, in FIGS. 20(A) and 20(B), the grooves 63b have a form radiating from the center of rotation of the shaft 61, it is to be understood that the form as viewed from above the grooves 63b is not necessarily linear. A spiral or any other form may be used. It is needless to say that by varying the form of the grooves 63b, the ability to remove the foreign substance and the abutting force per unit contact area to the disk can be set to the desired values.

The above-described principle of the construction can be applied to any other various types of disk drive devices such as an optical disk device and a magnetic disk device where chucking of the disk is done through the intermediary of the drive member which is brought by its plane into intimate contact with the disk-shaped recording medium.

As is apparent from the foregoing, according to the present embodiment, in the disk drive device where chucking of the disk-shaped recording medium having the predetermined record-reproduction system is done through the drive member having a plane in intimate contact with the disk-shaped recording medium, employment is made of the feature that a plurality of grooves are provided in the disk-shaped recording medium receiving surface of the aforesaid drive member at respective symmetric positions with respect to the center of rotation of the drive member, thereby giving excellent advantages that, even if the disk-shaped recording medium slips by a foreign substance such as dust between it and the drive member, the foreign substance is kicked out into the grooves provided in the disk-shaped recording medium receiving surface of the drive member, so that the normal chucking of the disk-shaped recording medium can immediately be recovered and that, as the rotation is driven accurately, access to the disk-shaped recording medium can be carried out reliably.

What is claimed is:

1. A motor comprising:
   (a) a motor housing comprising a hollow core portion, and bearing holding portions in an inner diameter of said hollow core portion;
   (b) bearings held in said bearing holding portions;
   (c) a rotary shaft inserted between said bearings;
   (d) a turntable attached to one end portion of said rotary shaft;
   (e) a separate bush attached to an other end portion of said rotary shaft and restricting movement of an outer end surface of said bearings to press a pre-load on said bearings; and
   (f) pressing means for exerting pressure on said bearings in a direction parallel to an axis of said rotary shaft, said pressing means providing a constant pressure on said bearings.

2. A motor according to claim 1, wherein said pressing means is a spring member, wherein said spring member in a natural state is curved, and wherein said spring member is fitted between said bearings and said turntable in such a manner that said spring member is changed from being curved to being flat by pressing to provide a pressure on said bearings.

3. A shaft bearing mechanism for a motor, comprising:
   (a) a motor housing comprising a hollow core portion, and bearing holding portions in an inner diameter of said hollow core portion;
   (b) bearings, held in said bearing holding portions, said bearings having an inner race an outer race and a bearing ball, said outer race engaging said motor housing;
   (c) a rotary shaft inserted between said bearings;
   (d) a turntable attached to one end portion of said rotary shaft;
   (e) a separate bush attached to an other end portion of said rotary shaft, and restricting movement of an outer end surface of said bearings to press a pre-load on said bearings; and
   (f) a pre-load spring held between the inner race of said bearings and said turntable, said pre-load spring being arranged to add spring pressure to said bearings when a pre-load on said bearings is absent.

4. A shaft bearing mechanism according to claim 3, wherein said pre-load spring is in a form of bent plate which becomes a flat washer when the pre-load is sealed on said bearings and regains its bent shape when the pre-load is absent.

5. A shaft bearing mechanism according to claim 4, wherein said pre-load spring comprises a plurality of extensions providing escapes therebetween along its inner circumference.

* * * * *

UNITED STATES PATENT AND TRADEMARK OFFICE
CERTIFICATE OF CORRECTION

PATENT NO. : 5,128,574

DATED : July 7, 1992

INVENTOR(S) : SHIGEKI KOIZUMI ET AL.

It is certified that error appears in the above-identified patent and that said Letters Patent is hereby corrected as shown below:

On the Title page

Item [73] Assignee:

"Canon Kabushiki Kaisha, Tokyo; Japan" should read "Canon Denshi Kabushiki Kaisha, Chichibu, Japan--.

Item [56] Reference Cited:

"Backlawski" should read --Baclawski et al.--.

"Rennerkens" should read --Reneerkens--.

"Yamamija" should read --Yamamiya et al.--.

"Elasser" should read --Elsasser et al.--.

COLUMN 1

Line 9, "motors," should read --motors--.

Line 15, "motor is becomes" should read --motor diameter is--.

Line 23, "space adequate for" should read --adequate space for the--.

Line 58, "general" should read --a general--.

COLUMN 2

Line 7, "turntable 8" should read --turntable 3--.

Line 35, "looseness" should read --and looseness--.

UNITED STATES PATENT AND TRADEMARK OFFICE
CERTIFICATE OF CORRECTION

PATENT NO. : 5,128,574

DATED : July 7, 1992

INVENTOR(S) : SHIGEKI KOIZUMI ET AL.

Figure 3A:
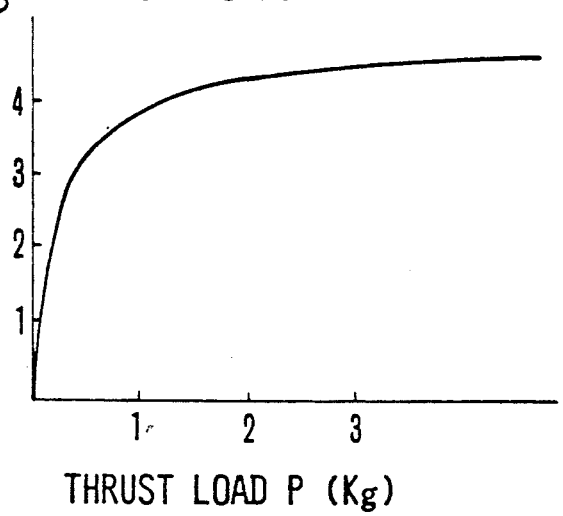
FIG. 3A is a graph illustrating the relation between the thrust load and the thrust displacement of the bearing and FIG. 3B is a cross-sectional view of a portion of the bearing.
Figure 3B:
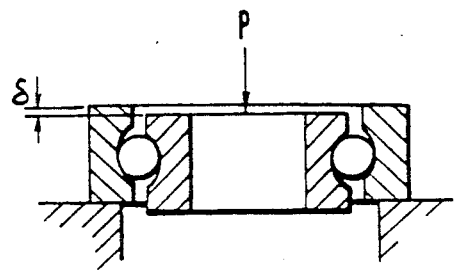

It is certified that error appears in the above-identified patent and that said Letters Patent is hereby corrected as shown below:

Line 37, "FIG. 3A" should read --FIG. 3A,--.

Line 55, "fixedly" should be deleted.

COLUMN 3

Line 8, "hold" should read --holding--.

Line 9, "optical disk an" should read --an optical disk, an--.

COLUMN 4

Line 48, "advantages" should read --the advantages--.

Line 52, "on the" should read --an--.

COLUMN 5

Line 1, "stator 1," should read --stator 21,--.

COLUMN 8

Line 3, after "shape" insert --and--.

COLUMN 9

Line 29, "with" should be deleted.

COLUMN 10

Line 17, "in" should be deleted.

UNITED STATES PATENT AND TRADEMARK OFFICE
CERTIFICATE OF CORRECTION

PATENT NO. : 5,128,574

DATED : July 7, 1992

INVENTOR(S) : SHIGEKI KOIZUMI ET AL.

It is certified that error appears in the above-identified patent and that said Letters Patent is hereby corrected as shown below:

COLUMN 12

Line 9, "bearings," should read --bearings--.

Line 10, "race an" should read --race, an--.

Signed and Sealed this

Twenty-ninth Day of December, 1992

Attest:

DOUGLAS B. COMER

*Attesting Officer*      *Acting Commissioner of Patents and Trademarks*